(12) United States Patent
Kaneko et al.

(10) Patent No.: US 6,826,366 B2
(45) Date of Patent: Nov. 30, 2004

(54) LOCK DEVICE FOR ACCESSORY-GRIP

(75) Inventors: Hidefumi Kaneko, Tokyo (JP); Katsuki Machida, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/101,962

(22) Filed: Mar. 21, 2002

(65) Prior Publication Data

US 2002/0136553 A1 Sep. 26, 2002

(30) Foreign Application Priority Data

Mar. 22, 2001 (JP) .................................... P2001-082110
Mar. 22, 2001 (JP) .................................... P2001-082122

(51) Int. Cl.$^7$ ..................... G03B 1/00; G03B 17/00; G03B 11/00

(52) U.S. Cl. ................. 396/388; 396/425; 396/544

(58) Field of Search ................. 396/388, 540, 396/406, 387, 420, 284, 395, 536, 541, 419, 425, 544

(56) References Cited

U.S. PATENT DOCUMENTS

| 4,110,770 A | * | 8/1978 | Lange | ............. 396/541 |
| 5,568,217 A | | 10/1996 | Arai et al. | ............. 396/536 |
| 6,246,840 B1 | | 6/2001 | Tani | ............. 396/536 |

* cited by examiner

*Primary Examiner*—David Gray
*Assistant Examiner*—Rochelle Blackman
(74) *Attorney, Agent, or Firm*—Greenblum & Bernstein, P.L.C.

(57) ABSTRACT

A lock device is provided for locking an accessory-grip to a camera body. A lock lever is movably supported by a housing. The lock lever is moved and can be stopped at a lock position, a partial release position, and a complete release position. First and second connecting members are movably supported by the housing, and can be displaced in association with the lock lever. When the lock lever is positioned at the lock position, the first and second connecting members are engaged with the camera body. When the lock lever is positioned at the partial release position, the first connecting member is released from the camera body and the second connecting member maintains the engaged state.

19 Claims, 16 Drawing Sheets

LOCK DEVICE FOR ACCESSORY-GRIP

BACKGROUND OF THE INVENTION

1. Field of the Invention

The present invention relates to an accessory-grip, which is detachably attached to a camera body.

2. Description of the Related Art

Conventionally, a camera has various kinds of electric circuits, to which electric power is supplied from a battery mounted in the camera body. Exhaustion of the battery changes, depending upon the conditions under which the camera is used. For example, when constantly or even commonly performing a photography with an electronic flash, the life of the battery is drastically shortened, and thus the battery has to be changed quite often. Therefore, a camera is proposed, in which an accessory-grip housing batteries, the number of which is greater than that in the camera body, is detachably attached to the camera body, so that the camera can be used for a long time without changing the batteries.

In a usual photographing state, a camera body is set to a horizontal position, in which the shutter button is positioned at the upper-right of the camera body when being used by its operator, i.e., when seen from the rear of the camera. Depending on the photographic object, the camera may be set to a vertical position in which the camera body is rotated from the horizontal position about the optical axis of the photographing optical system. When the camera is set to the vertical position, however, the shutter button is positioned at an upper portion of the left surface of the camera body when viewed by the user. This causes an awkward shutter release operation. Therefore, a camera has been proposed, in which, separate from a first shutter button provided on the camera body, a second shutter button is provided on an accessory-grip housing a battery in such a manner that the second shutter button is positioned at the upper-right when viewed by the user, similarly to that in the horizontal position.

In the conventional accessory-grip, the housing is connected to an internal thread of a tripod provided on the bottom surface. Namely, the accessory is provided with an external thread with which the internal thread is screwed, and a dial, attached to the external thread member, projects from a side surface of the accessory-grip, so that the accessory-grip can be attached to and detached from the camera body, by rotating the dial. However, in the attaching and detaching operation, the dial has to be rotated several times, which is cumbersome and takes time. Further, in the detaching operation, since it is not easy to recognize whether the external thread is released from the internal thread, the accessory-grip may accidentally drop off from the camera body at the moment the external thread releases from the internal thread.

SUMMARY OF THE INVENTION

Therefore, an object of the present invention is to provide a lock device in which attaching and detaching operations of an accessory-grip of a camera are simplified and that prevents the accessory-grip from accidentally dropping from the camera body.

According to the present invention, there is provided a device for locking an accessory-grip to a camera body, the device comprising a housing, a lock lever, and first and second connecting members.

The lock lever is movably supported by the housing. The lock lever is moved at least between a lock position and a partial release position different from the lock position. The first and second connecting members are movably supported by the housing, and can be displaced in association with the lock lever. The first and second connecting members are engaged with the camera body, when the lock lever is positioned at the lock position. The first connecting member is released from the camera body while the second connecting member continues to be engaged with the camera body, when the lock lever is positioned at a partial release position.

The lock lever may project from a guide slot formed in the housing and be movable along the guide slot. In this structure, dust or foreign matter may enter the housing through the guide slot.

Therefore, another object of the present invention is to provide a lock device in which dust and foreign matter are prevented from entering the housing through the guide slot.

According to the present invention, there is provided a device for locking an accessory-grip to a camera body, the device comprising a housing having a guide slot, a lock lever, and a lever curtain.

The lock lever is provided for locking the accessory-grip to the camera body and releasing the accessory from the camera body. The lock lever projects from the guide slot and is movable along the guide slot. The lever curtain is provided to a periphery of the guide slot to cover the guide slot and allow the lock lever to move along the guide slot.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
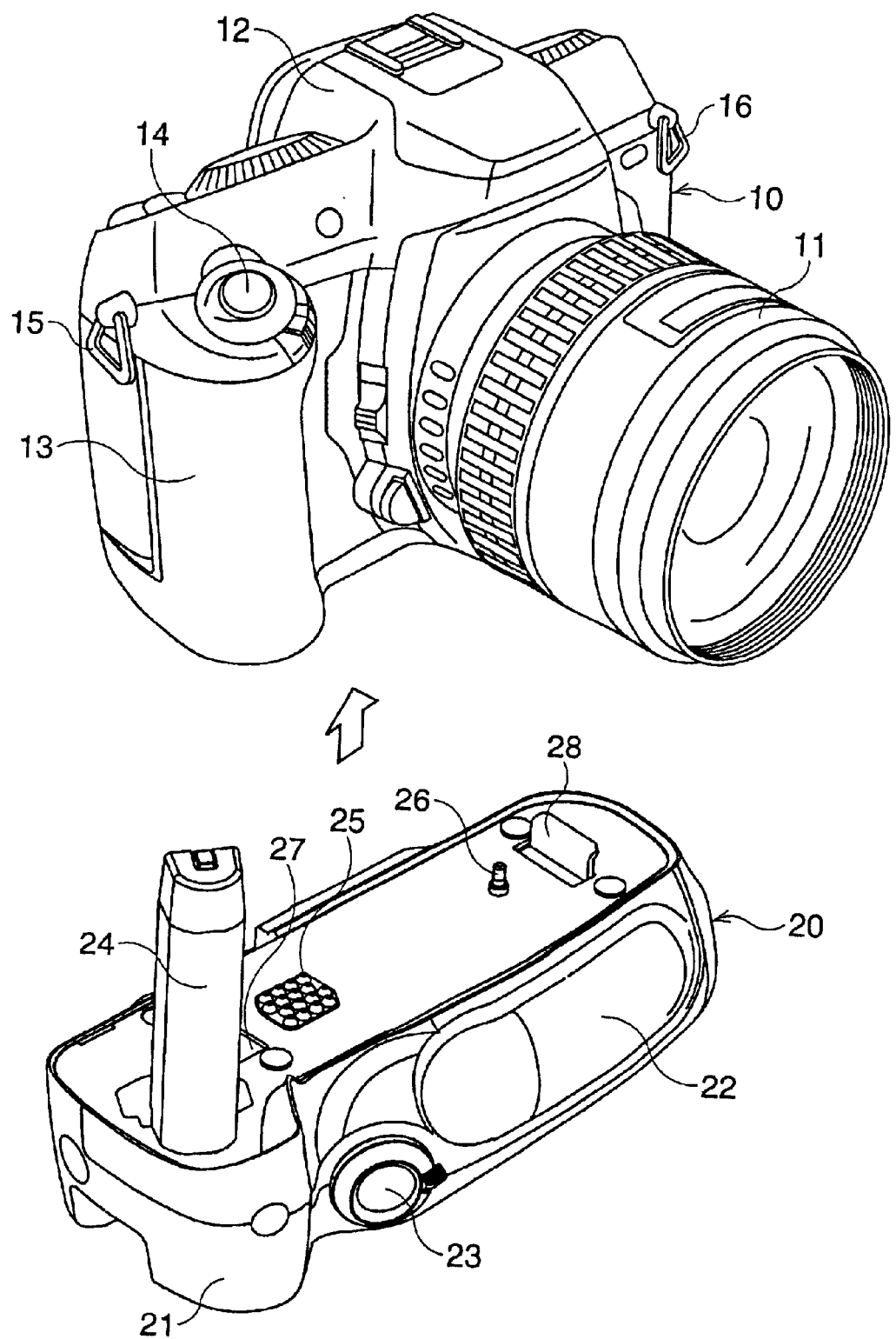
FIG. 1 is an exploded perspective view showing a camera body and an accessory-grip, to which an embodiment of the present invention is applied.

The present invention will be described below with reference to the embodiments shown in the drawings.

FIG. 1 shows a state in which a camera body 10 and an accessory-grip 20 of an embodiment of the present invention are disassembled, and the camera body 10 is set to a horizontal position. The accessory-grip 20 is detachably attached to a bottom surface of the camera body 10.

In the camera body 10, an interchangeable lens 11 is detachably attached to a front surface, and a viewfinder 1 is provided on a center portion of an upper surface. On the left side of the camera body 10 viewed from the front thereof, a first grip portion 13, projecting forward so that the user can easily hold the camera body 10, is formed, and a first shutter button 14 is provided on the upper surface of the first grip portion 13. On the right and left shoulders of the camera body 10, triangle rings 15 and 16 are fixed to attach a strap.

In the accessory-grip 20, on the left end portion when viewing the camera from the front thereof, a bulge 21 is formed which projects forward so that the horizontal section shape coincides with the lower end of the first grip portion 13. Further, on a lower end portion of the accessory-grip 20, a second grip portion 22 extending in a horizontal direction projects forward. On the second grip portion 22, a second shutter button 23 is provided on a portion close to the bulge 21. Namely, when the camera body 10 is in a vertical position, after being rotated clockwise by about 90 degrees when viewed from the front, the second shutter button 23 faces upward.

In the accessory-grip 20, other than batteries, various kinds of electric circuits are mounted, which generate predetermined signals by operating the second shutter button 23 and so on. On an upper surface of the accessory-grip 20, an insert member 24 is provided, which houses lead wires for supplying electric power generated by the batteries into electric circuits provided in the camera body 10. The insert member 24 is inserted in a hole (not shown) formed in the camera body 10. Signal contact pins 25 for transmitting electric signals to the electric circuits provided in the camera body 10 are provided on an upper surface of the accessory-grip 20. Further, on the upper surface, a positioning pin 26, for positioning the accessory-grip 20 on the camera body 10 when connecting them, and first and second connecting members 27 and 28, for fixing the accessory-grip 20 to the camera body 10, are provided.

Figure 2:
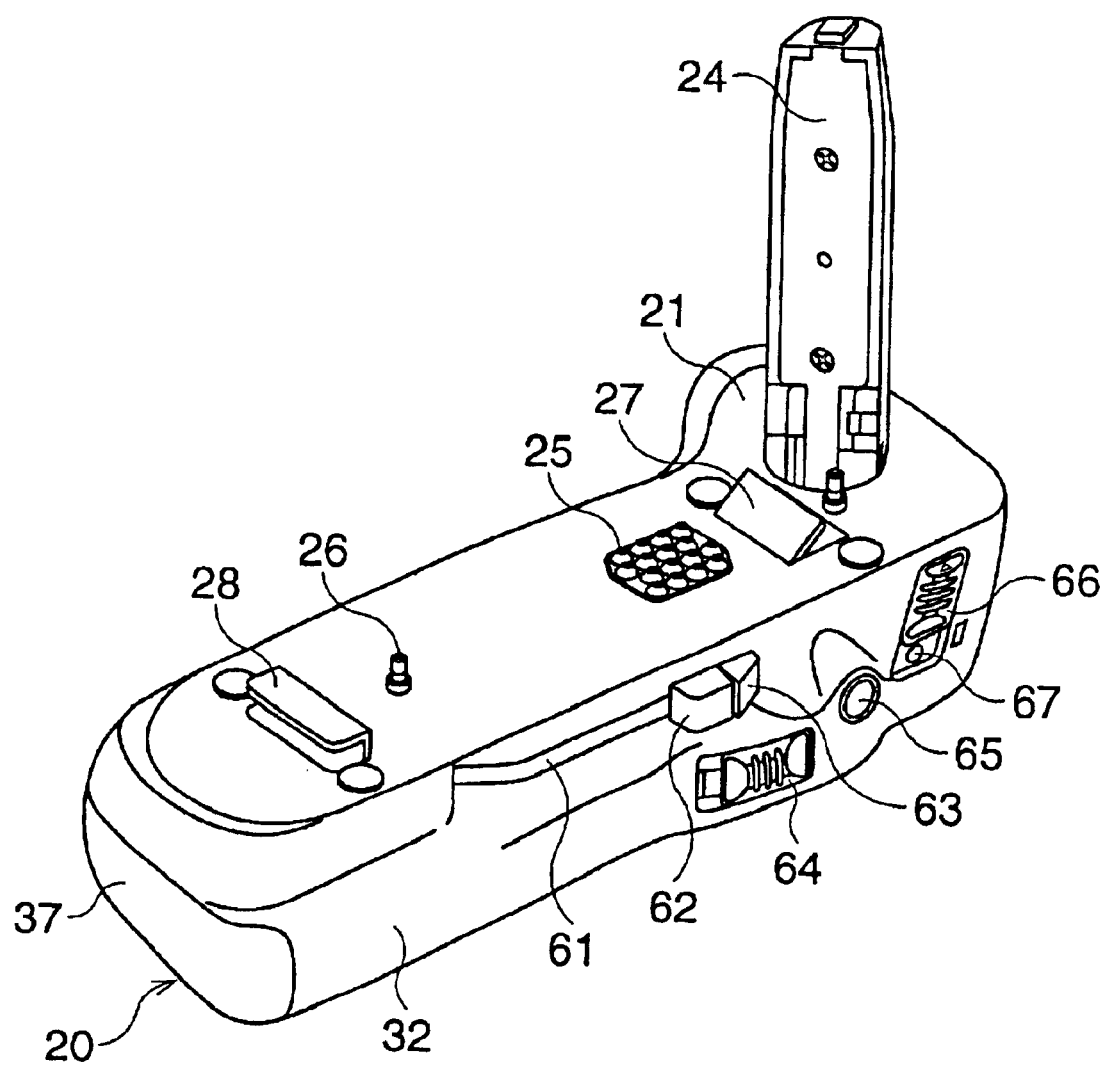
FIG. 2 is a perspective view of the accessory-grip viewed from the behind thereof.

FIG. 2 is a perspective view of the accessory-grip 20 when viewed from the behind thereof.

The housing of the accessory-grip 20 is composed of a front cover 31 (see FIG. 3) and a rear cover 32, and an opening formed on a side surface of the housing is closed by a lid 37. A guide slot 61, extending in a horizontal direction, is formed on the rear cover 32, and a lock lever 62 of a lock device is inserted through the guide slot 61, so as to maintain a connecting condition of the camera body 10 and the accessory-grip 20. The lock lever 62 is movable along the guide slot 61, and thus movably supported by the housing. When viewing the accessory-grip 20 from the behind thereof, a lock release member 63 is provided close to the right end of the guide slot 61. The lock release member 63 is movable in a direction vertical to a wall surface of the rear cover 32.

In the rear cover 32 of the accessory-grip 20, a power source switch 64 is provided under the lock release member 63, and an AE lock button 65 is provided to a right side of the power source switch 64. By operating the power source switch 64, an electric power supply, from the batteries provided in the accessory-grip 20 to the electric circuits provided in the camera body 10, is started. By operating the AE lock button 65, an exposure condition is fixed for a predetermined period of time. Further, in the rear cover 32, a remote-control switch 66 for turning ON and OFF a remote-control photographing mode, and a remote-control window 67 for receiving an infrared light beam ejected from a remote-controller (not shown) when performing a remote-control photographing operation, are provided.

Figure 3:
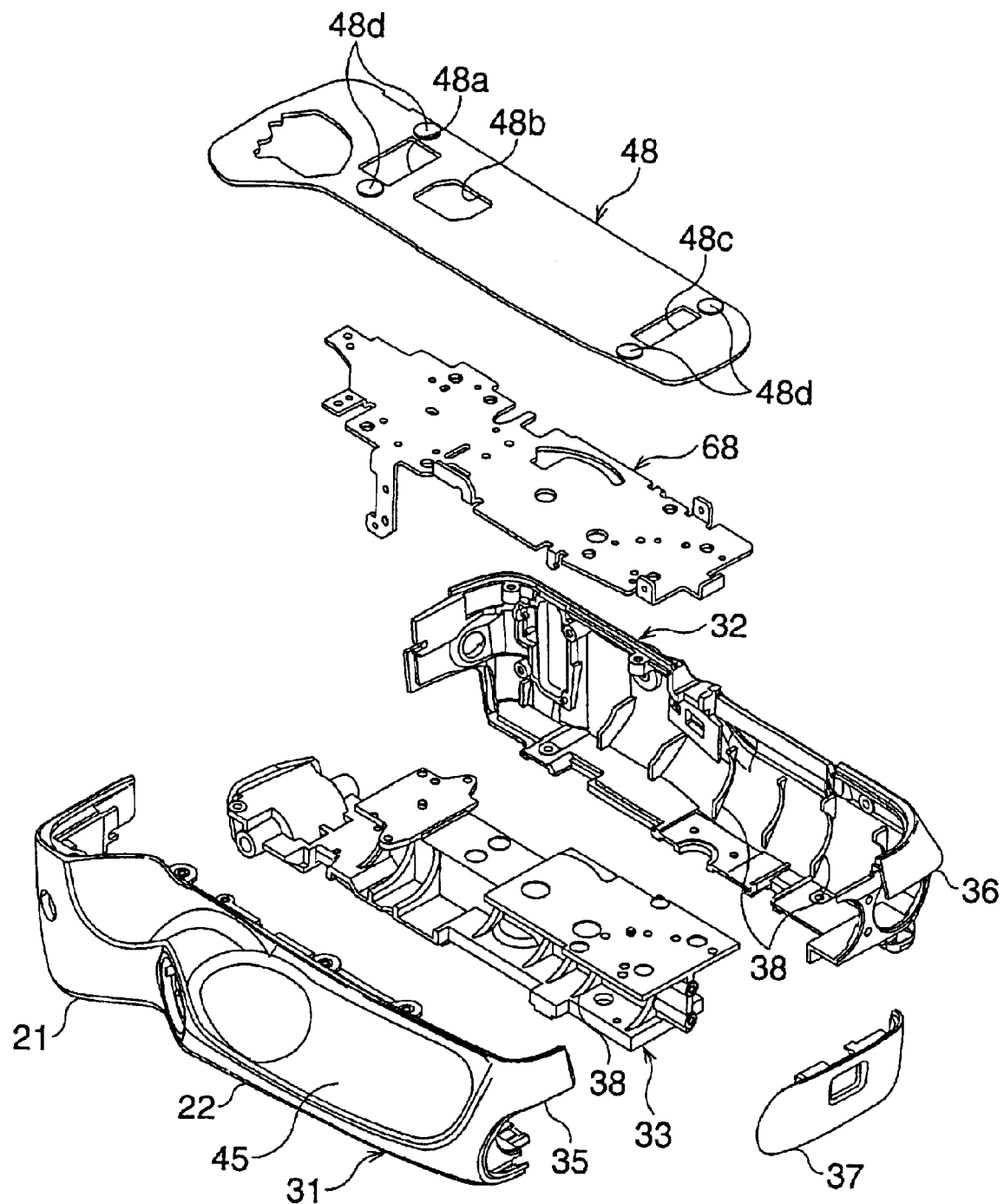
FIG. 3 is an exploded perspective view showing a housing of the accessory-grip.
Figure 4:
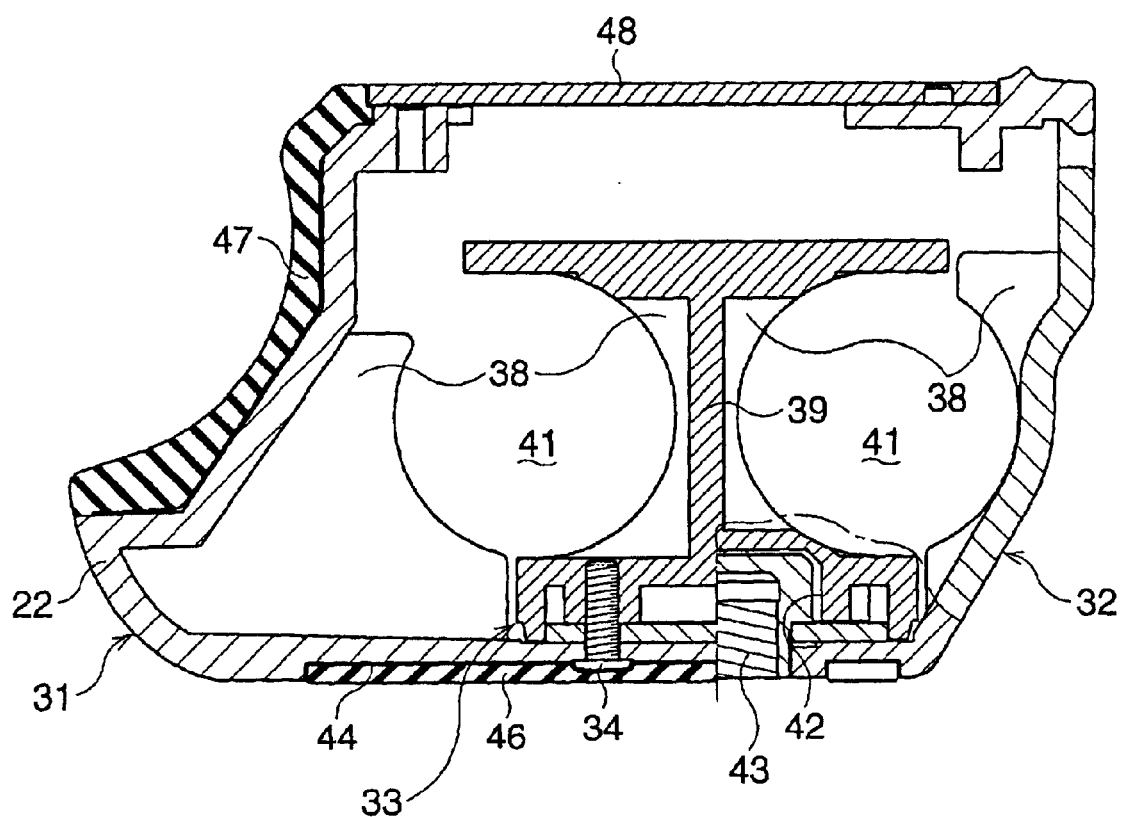
FIG. 4 is a sectional view of the accessory-grip.

With reference to FIGS. 3 and 4, a construction of the housing of the accessory-grip 20 will be described below. Note that, in FIG. 3, the insert member 24 (see FIGS. 2 and 3) is omitted.

The housing of the accessory-grip 20 has the front cover 31 corresponding to a front surface of the camera body 10, the rear cover 32 corresponding to a rear surface of the camera body 10, and a partition 33 provided between the front cover 31 and the rear cover 32. The front cover 31 and the rear cover 32 have approximately the same lengths as the breadth of the camera body 10, and are fixed to the partition 33 by a screw 34. As described above, the front cover 31 has the bulge 21 and the second grip portion 22, and a first notch 35 is formed on an end portion of the second grip portion 22 opposite to the bulge 21. A second notch 36 is formed in the rear cover 32 at a portion corresponding to the first notch 35. In a state in which the front cover 31, the rear cover 32, and the partition 33 are assembled, an opening defined by the first and second notches 35 and 36 is closed by the lid 37, as described above.

The partition 33 is slightly shorter than the front cover 31 and the rear cover 32, and extends over approximately the whole breadth of the camera body 10. A lot of ribs 38, recessed in an arc-shape along an outer surface of a battery, are formed on a wall surface of the front cover 31, the rear cover 32, and the partition 33. Namely, in a state in which the front cover 31, the rear cover 32, and the partition 33 are assembled, as shown in FIG. 4, battery chambers 41 for housing a plurality of batteries are defined, and the partition 33 functions as a wall separating the batteries in the battery chambers 41. Further, the partition 33 has a flat plate 39 vertical to the optical axis of the interchangeable lens (photographing optical system) 11. Due to the flat plate 39, the flexural rigidity of the accessory-grip 20 is heightened, so that the strength performance is improved. Note that a tripod internal thread member 43 is provided in a hole 42 formed on a lower surface of the partition 33 and around the center of the longitudinal direction of the partition 33 (i.e., the breadth direction of the camera body 10).

The front cover 31, the rear cover 32, and the partition 33 are made of resin, and are molded by a die assembly having an upper die and a lower die, which are displaced in a horizontal direction in FIG. 4. Thus, the housing of the accessory-grip 20 is divided into the front cover 31 and the rear cover 32, which are connected by the partition 33. Due to this, in the manufacturing process of the resin-molded members, the mold-release operation of the resin-molded members from the dies is easy, so that the manufacturing cost is reduced.

On the outer bottom surfaces of the front cover 31 and the rear cover 32, the portions where the screw 34 for connecting the covers 31 and 32 to the partition 33 is provided are recessed, and a bottom rubber cover 46 is provided to these recessed portions 44. An external rubber cover 47 is adhered on an upper surface of the front cover 31. A metal support plate 68 is placed on an upper surface of the partition 33, and an opening formed on an upper portion of the front cover 31 and the rear cover 32 is closed by an upper plate 48. Rectangular openings 48a, 48b, and 48c are formed in the upper plate 48. Further, disk-shaped pads 48d formed of elastic material such as rubber are provided on the upper plate 48 and are close to the short sides of the openings 48a, 48b, and 48c.

Figure 5:
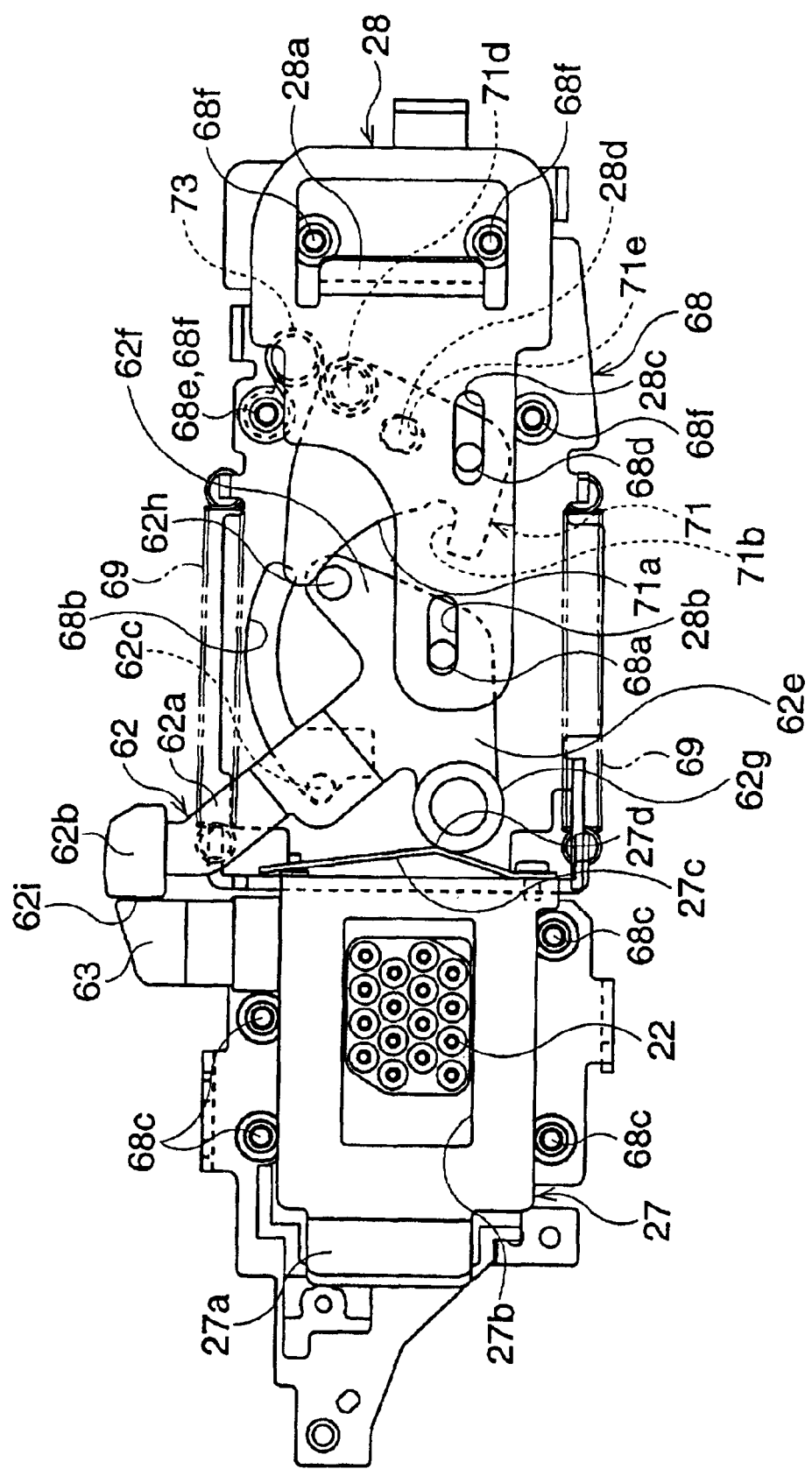
FIG. 5 is a plan view of a lock device in which a lock lever is set to a lock position.
Figure 6:
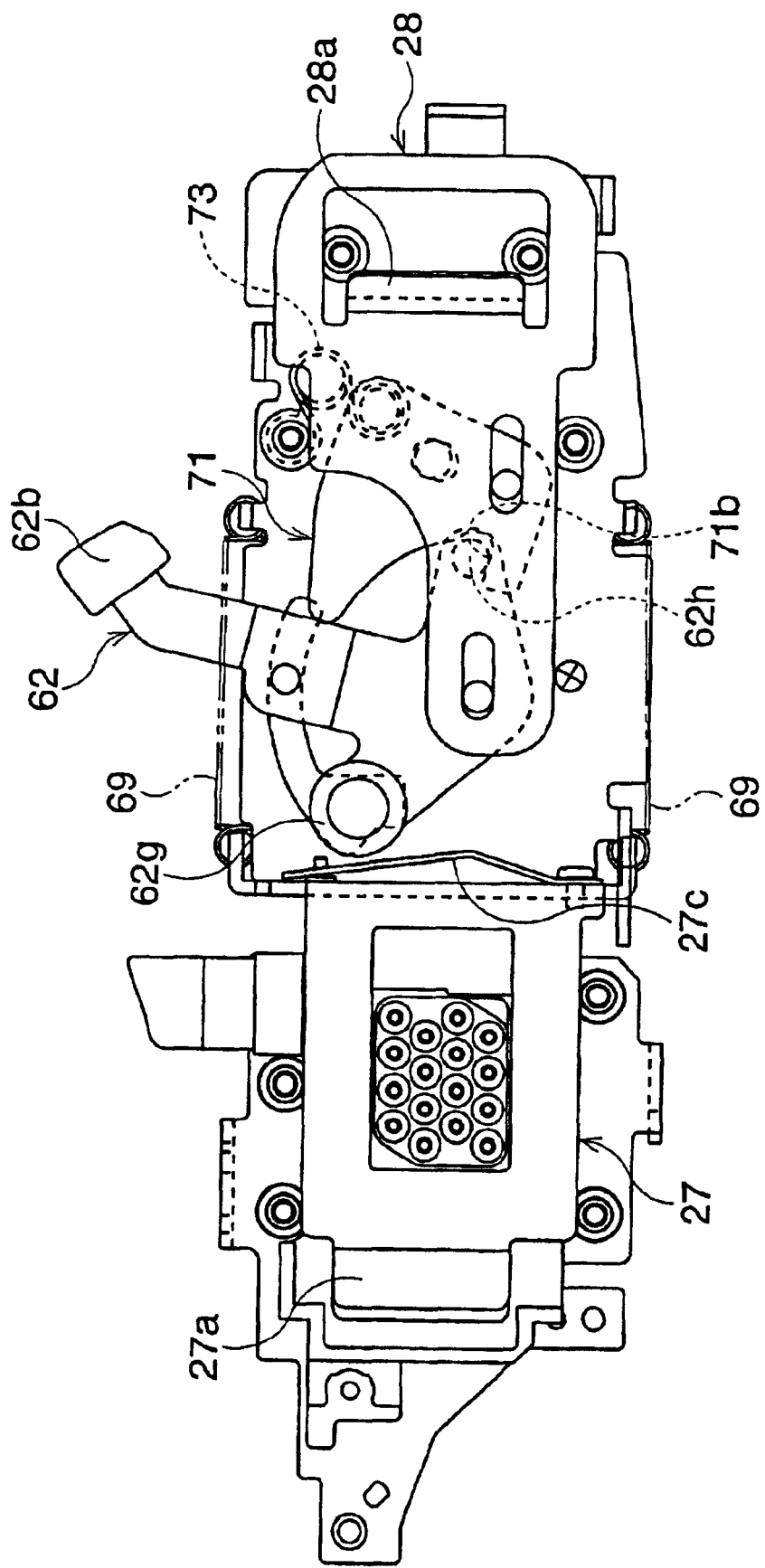
FIG. 6 is a plan view of the lock device in which a lock lever is set to a partial release position.
Figure 7:
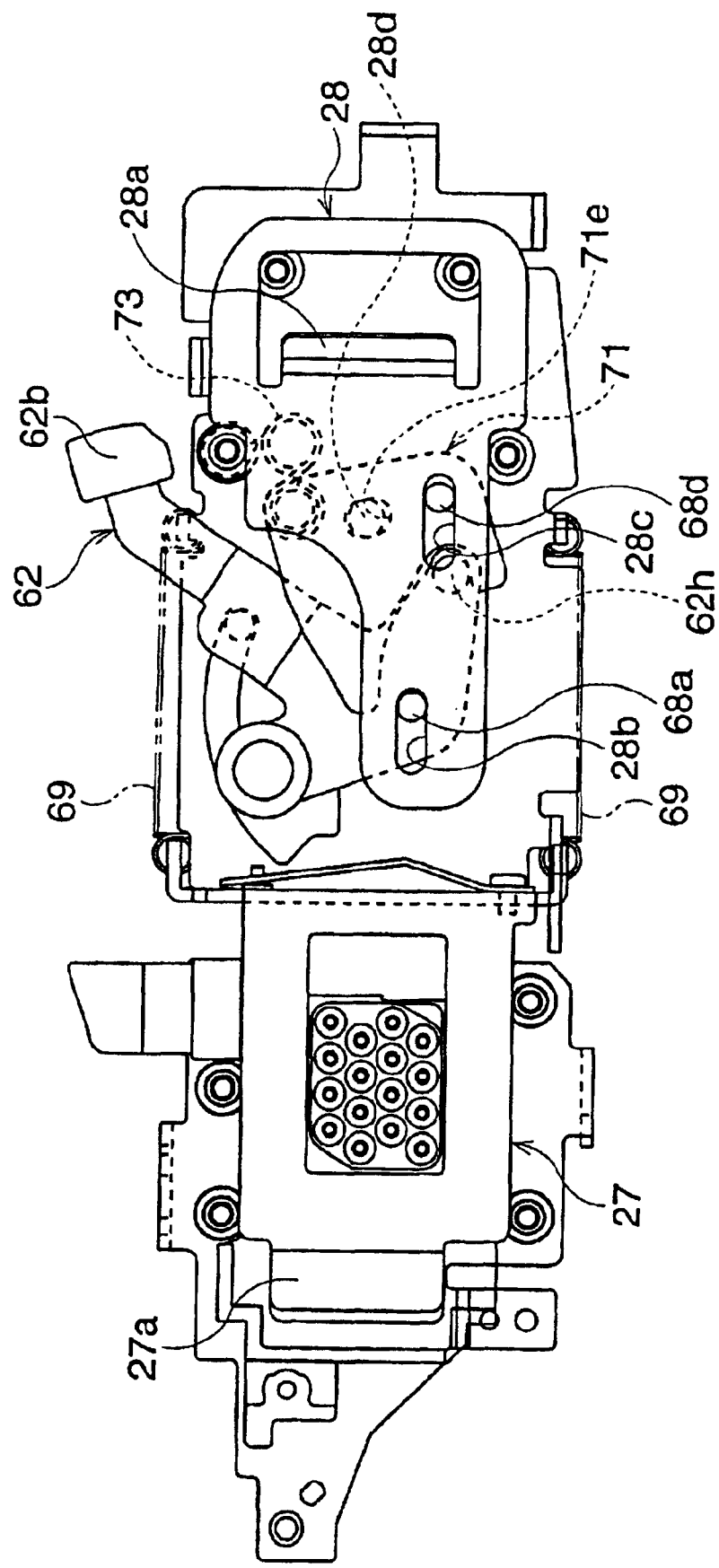
FIG. 7 is a plan view of the lock device in which a lock lever is set to a complete release position.

With reference to FIGS. 5, 6, and 7, a construction of the lock device will be described. FIG. 5 shows a state in which the lock lever 62 is set to a lock position so that the accessory-grip 20 is firmly connected to the camera body 10, FIG. 6 shows a state in which the lock lever 62 is set to a partial release position so that the accessory-grip 20 is partially connected to the camera body 10, and FIG. 7 shows a state in which the lock lever 62 is set to a complete release position so that the accessory-grip 20 is completely released from the camera body 10. Namely, the lock lever 62 is moved among the lock position, the partial release positions, and the complete release position, which are different from each other.

The lock lever 62 is swingably supported by a pivot pin 68a fixed to the support plate 68 to move along the support plate 68. An arm 62a of the lock lever 62 projects outward from an edge of the support plate 68, and a lock button (i.e., operating portion) 62b is provided at the tip of the arm 62a. A guide pin 62c is planted on a surface of the arm 62a, the surface facing the support plate 68. The guide pin 62c is engaged with an arc-shaped slot 68b, which is formed in the support plate 68b and of which the center of curvature is the pivot pin 68a. Namely, the lock lever 62 is rotatable in a range in which the guide pin 62c can move within the slot 68b. The lock lever 62 has first and second projecting portions 62e and 62f extending from the pivot pin 68a in roughly a vertical direction to the arm 62a. An annular collar 62g is pivotally provided to a tip portion of the first projecting portion 62e, and a press pin 62h is fixed on a tip portion of the second projecting portion 62f.

The first connecting member 27 is guided by four guide rollers 68c provided on an upper surface of the support plate 68, so that the first connecting member 27 is movably supported by the support plate 68 or the housing. A connecting claw 27a formed on an edge of the first connecting member 27 projects from the opening 48a (see FIG. 3) of the upper plate 48, and is displaced in association with the lock lever 62, so that the connecting claw 27a can be engaged with an edge of an opening formed in a bottom surface of the camera body 10, as will be described later. The first connecting member 27 has a rectangular opening 27b (third opening). Signal contact pins 22, for electrically connecting an electric circuit provided in the accessory-grip 20 and an electric circuit provided in the camera body 10, are positioned in the opening 27b. Namely, the signal contact pins 22 project from the opening 48b (see FIG. 3) of the upper plate 48, and can be in contact with electric contacts provided on a bottom surface of the camera body 10.

The first connecting member 27 and the support plate 68 are connected by a pair of tension springs 69, so that the first connecting member 27 is always urged toward the lock lever 62, i.e., the opposite direction to the connecting claw 27a. A plate spring 27c bent in a mount shape is provided on an edge of the first connecting member 27, the edge being located at an opposite portion of the connecting member 27 to the connecting claw 27a. The collar 62g of the lock lever 62 can be engaged with the plate spring 27c. Namely, the first connecting member 27 is pressed by the lock lever 62 through the plate spring 27c, to displace outward, i.e., toward the connecting claw 27a.

An intermediate lever 71 is rotatably supported by the pivot pin 68d fixed on the support plate 68. An edge 71a of the intermediate lever 71, on the side of the lock lever 62, is formed in an arc-shape so as to avoid interfering with the press pin 62h. The notch 71b, with which the press pin 62h is engaged, is formed on an end portion of the edge 71a close to the pivot pin 68d. A pin 71d fixed on the intermediate lever 71 and a pin 68e fixed on the support plate 68 are connected by an omega spring 73. Due to this, the intermediate lever 71 is stably rested at a first position (see FIG. 7), in which the intermediate lever 71 is positioned closer to the lock lever 62, and at a second position (see FIGS. 5 and 6), in which the intermediate lever 71 is positioned closer to the second connecting member 28. Note that a hole 71e, which is engaged with a connecting pin 28d provided to the second connecting member 28, is formed in the intermediate lever 71, as will be described later.

The second connecting member 28 is guided by four guide rollers 68f provided on an upper surface of the support plate 68, and is movably supported by the support plate 68, i.e., the housing. The moving direction of the second connecting member 28 is parallel to the moving direction of the first connecting member 27, and these are opposite to each other. Note that one of the guide rollers 68f is the pin 68e described above. A connecting claw 28a is formed on the second connecting member 28. The connecting claw 28a projects through the opening 48c (see FIG. 3) of the upper plate 48. As will be described later, the second connecting member 28 is displaced in association with the lock lever 62, so that the connecting claw 28a can be engaged with an edge of an opening formed in a bottom surface of the camera body 10. First and second guide slits 28b and 28c, extending along the moving direction, are formed on the second connecting member 28. The first guide slit 28b is engaged with the pivot pin 68a, and the second guide slit 28c is engaged with the pivot pin 68d. A connecting pin 28d fixed on the connecting member 28 is engaged with the hole 71e of the intermediate lever 71.

Figure 8:
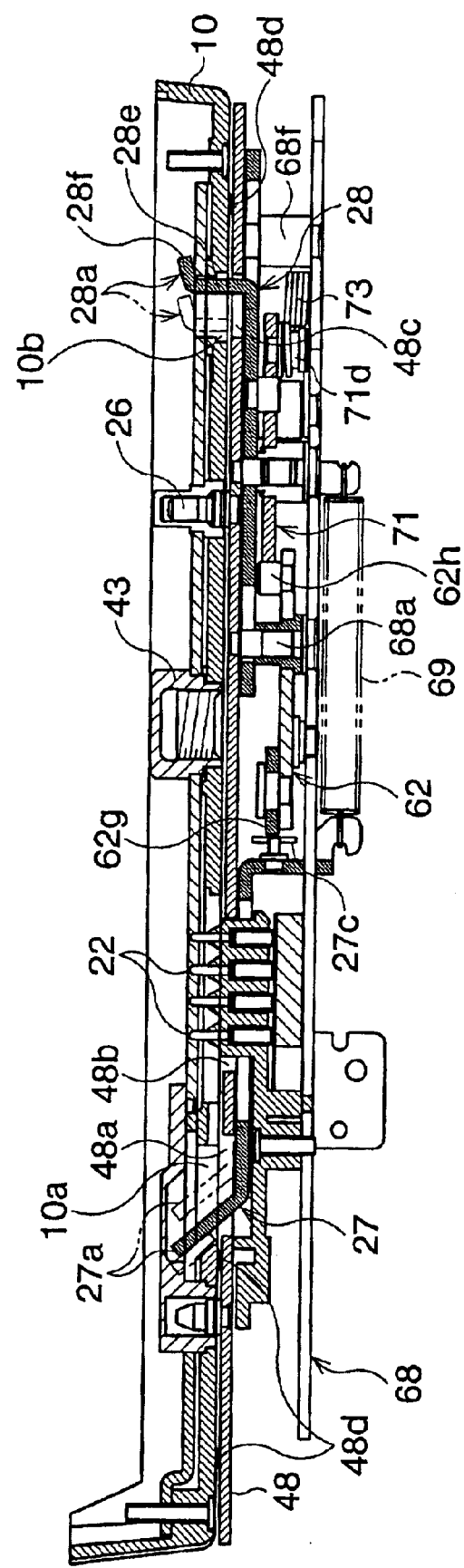
FIG. 8 is a sectional view showing a connecting condition of the accessory-grip and the camera body.

FIG. 8 is a sectional view showing a connecting condition in which the accessory-grip 20 is connected to the camera body 10. As understood from the drawing, the connecting claw 27a of the first connecting member 27 has a flat plate inclining by approximately 45 degrees relative to the moving direction, and the moving range of the connecting claw 27a is approximately half the breadth of the opening 10a of the camera body 10. On the other hand, the connecting claw 28a of the second connecting member 28 has a rising portion 28e extending vertically to the moving direction and an engaging portion 28f extending from an upper end of the rising portion 28e and slightly inclining by an angle close to the horizontal. The moving range of the connecting claw 28a is around the same as the breadth of an opening 10b of the camera body 10, and the breadth of the engaging portion 28f is less than the breadth of the opening 10b. Under the lock condition in which the accessory-grip 20 is fixed to the camera body 10, the pads 48d are sandwiched between the accessory-grip 20 and the camera body 10 to deform and tightly contact the bottom surface of the camera body 10. This tight contact is due to pressure generated by the inclined planes of the connecting claws 27a and 28a, so that ricketiness and slip between the accessory-grip 20 and the camera body 10 is prevented.

The operation of the lock device will be described below.

As shown in FIG. 5, when the lock lever 62 is set to the lock position, the lock button 62b is positioned in such a manner that a side surface 62i of the lock button 62b is close to the lock release member 63, and the collar 68g urges a portion close to a bent portion 27d of the plate spring 27c. Accordingly, the first connecting member 27 is depressed by a spring force generated by the collar 62g urging the plate spring 27c, so that the first connecting member 27 is displaced toward the connecting claw 27a, against the spring forces of the tension springs 69. On the other hand, the intermediate lever 71 is rested by the spring force of the omega spring 73 at a position where the intermediate lever 71 presses the second connecting member 28 to the connecting claw 28a, i.e., outward. Namely, the first and second connecting members 27 and 28 are positioned separate from each other and are fixed there, and in a state in which the accessory-grip 20 is attached to the camera body 10, the connecting claws 27a and 28a are engaged with the outer edges of the openings 10a and 10b of the bottom surface of the camera body 10, so that the accessory-grip 20 and the camera body 10 are firmly connected to each other.

When the accessory-grip 20 is to be released from the camera body 10, first, the lock release member 63 is depressed to the first connecting member 27, so that the side surface 62i of the lock button 62b is exposed. Thus, the lock lever 62 becomes easily operable, and if the side surface 62i is depressed toward the second connecting member 28, the collar 62g gets over the bent portion 27d by bending the plate spring 27c, and the lock lever 62 is then stopped at a position where the press pin 62h is engaged with the notch 71b of the intermediate lever 71. This condition is the partial release position shown in FIG. 6, in which the first connecting member 27 is displaced inward (i.e., the side of the lock lever 62) by the tension spring 69, since the plate spring 27c is released from the collar 62g. Thus, the connecting claw 27a of the first connecting member 27 is released from the edge of the opening 10a of the camera body 10. Conversely, the second connecting member 28 is urged by the omega spring 73 to rest, and the connecting claw 28a continues to engage the edge of the opening 10b of the camera body 10. In this state, although the side of the connecting claw 27a of the accessory-grip 20 can be released from the camera body 10, the positioning pin 26 is engaged with an inner wall of an insert hole formed in the camera body 10 to operate in association with the connecting claw 28a, so that the state, in which the accessory-grip 20 is connected to the camera body 10 through the second connecting member 28, is maintained. Accordingly, even if the user releases the accessory-grip 20 from the hand, the accessory-grip 20 will not drop.

If the lock lever 62 is further moved from the partial release position (see FIG. 6) to the side of the second connecting member 28, the press pin 62h depresses the notch 71b, so that the intermediate lever 71 is rotated counterclockwise in FIG. 7. As a result, the second connecting member 28 is moved inward (i.e., the side of the lock lever 62) through the connecting pin 28d, and is stopped at the complete release position shown in FIG. 7. In this state, the connecting claw 28a of the second connecting member 28 is released from the edge of the opening 10b of the camera body 10. Namely, the connecting claws 27a and 28a of the first and second connecting members 27 and 28 are both released from the camera body 10, so that the accessory-grip 20 is released from the camera body 10.

When the accessory-grip 20 is to be attached to the camera body 10, first, the accessory-grip 20 is brought into contact with a bottom surface of the camera body 10, so that the connecting claws 27a and 28a are inserted into the openings 10a and 10b of the camera body 10. Then, the lock lever 62, set to the complete release position (see FIG. 7), is rotated to the side of the first connecting member 27, and is set to the lock position (see FIG. 5). Thus, the connecting members 27 and 28 are displaced outward, so that the connecting claws 27a and 28a are engaged with the edges of the openings 10a and 10b of the camera body 10. At this time, by the pressure generated due to the inclined planes of the connecting claws 27a and 28a, the pads 48d existing between the bottom of the camera body 10 and the upper plate 48 of the accessory-grip 20 are elastically deformed, so that the connection between camera body 10 and the accessory-grip 20 is set to a reliable condition without ricketiness.

As described above, in a detaching operation of the accessory-grip 20 from the camera body 10, the lock lever 62 is rotated from the lock position (FIG. 5) to the partial release position (FIG. 6), and is temporarily fixed at the partial release position, where the accessory-grip 20 is still connected to the camera body 10 through the second connecting member 28. Therefore, the accessory-grip 20 is prevented from dropping accidentally. Further, an operation, in which the lock lever 62 is moved from the lock position to the complete release position via the partial release position, and an operation, in which the lock lever 62 is moved from the complete release position to the lock position, are performed only by rotating the lock lever 62. Thus, the attaching operation and the detaching operation between the accessory-grip 20 and the camera body 10 are extremely simple.

Further, since the plate spring 27c is provided to the first connecting member 27, when the lock lever 62 is to be rotated, the lock lever 62 should be pressed with a force which is large enough for the collar 62g to get over the bent portion 27d of the plate spring 27c. Thus, since the click-stop mechanism is provided to give a predetermined resistance against the movement of the lock lever 62 when the lock lever 62 is switched between the lock position and the partial release position, the lock lever 62 set to the lock position is prevented from being accidentally operated.

Figure 9:
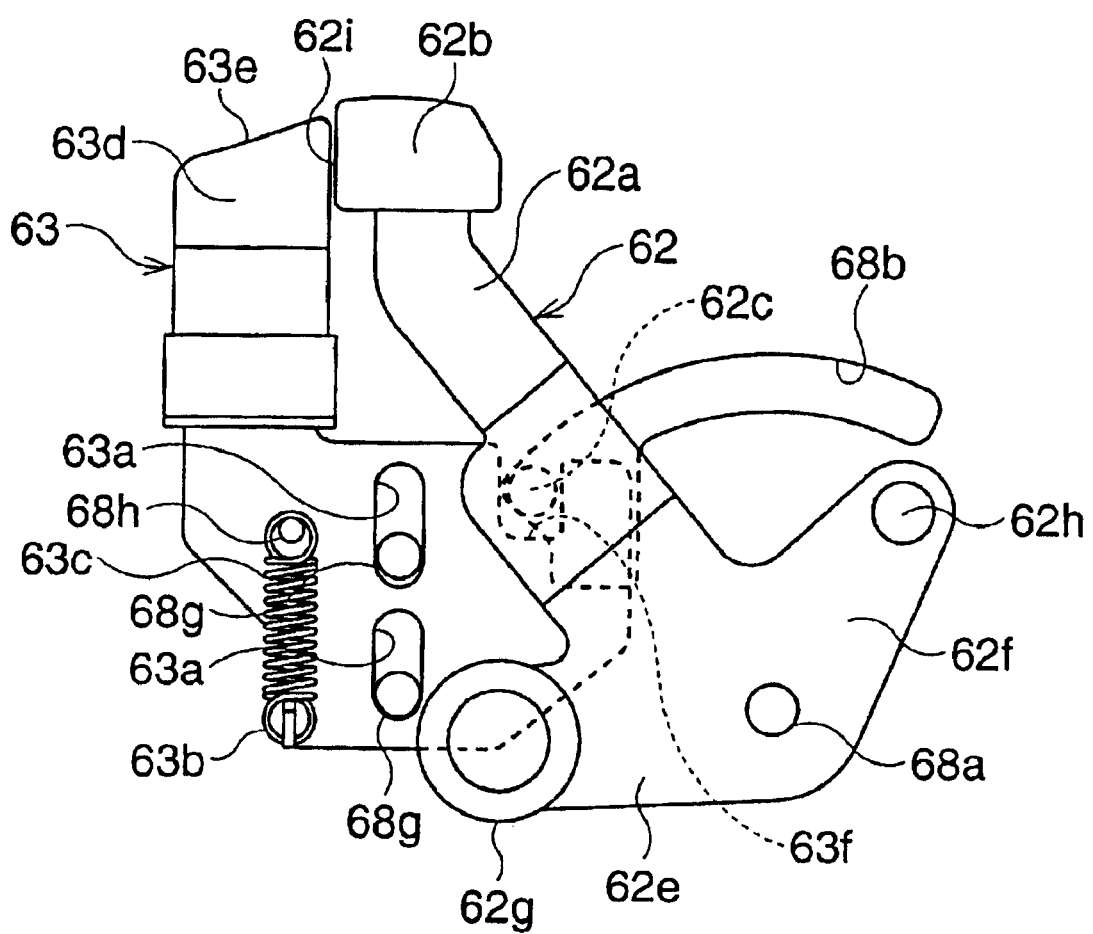
FIG. 9 is a view showing a state in which a lock release member faces a side surface of a lock button.
Figure 10:
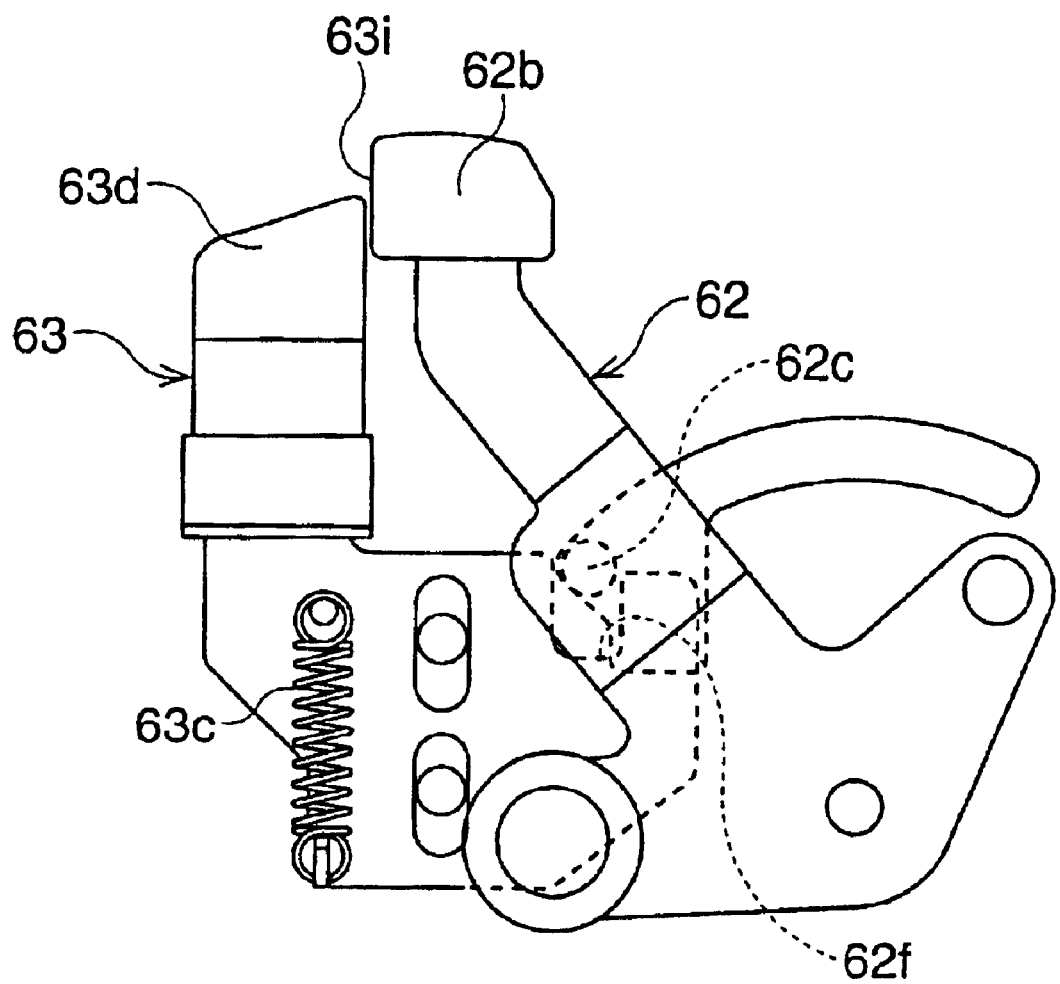
FIG. 10 is a view showing a state in which a lock release member separates from the side surface of the lock button.

FIGS. 9 and 10 show structures of the lock lever 62 and the lock release member 63. The lock release member 63 is disposed at a position, which is close to an end portion of the lock lever 62 fixed at the lock position, and which is opposite to the partial release position relative to the lock lever 62. A pair of slits 63a is formed in the lock release member 63, with which a pair of pins 68g provided to the support plate 68 are engaged. The slits 63a extend in a direction substantially perpendicular to the moving direction of the lock lever 62. Namely, the lock release member 63 is movable in a direction substantially perpendicular to the moving direction of the lock lever 62. A hook 63b formed on a lower end portion of the lock release member 63 and a pin 68h provided to the support plate 68 are connected by a spring 63c, so that the lock release member 63 is always urged toward the rear cover 32 (see FIG. 3), i.e., in a direction in which the lock release member 63 projects from the rear cover 32 (i.e., the upper direction in FIGS. 9 and 10).

A lock release button 63d is provided to an end portion of the lock release member 63. An end surface 63e of the lock release button 63d is not perpendicular to the moving direction of the lock release member 63, but is slightly inclined to a plane vertical to the moving direction. Due to this, the lock release member 63 becomes easily depressed.

An engaging notch 63f is formed in the lock release member 63. When the lock lever 62 is at the lock position as shown in FIG. 9, the guide pin 62c of the lock lever 62 is engaged with the engaging notch 63f, so that the lock lever 62 is fixed at the lock position. Conversely, when the lock release member 63 is depressed against the spring force of the spring 63c as shown in FIG. 10, the guide pin 62c is released from the engaging notch 63f, so that the lock lever 62 become rotatable. Further, in this state, since the side surface 62i of the lock button 62d is exposed by the displacement of the lock release button 63d, the user can easily operate the lock button 62b. In other words, in a state in which the lock release button 63d covers the side surface 62i of the lock button 62b as shown in FIG. 9, the lock button 62b cannot be accidentally pressed.

Figure 11:
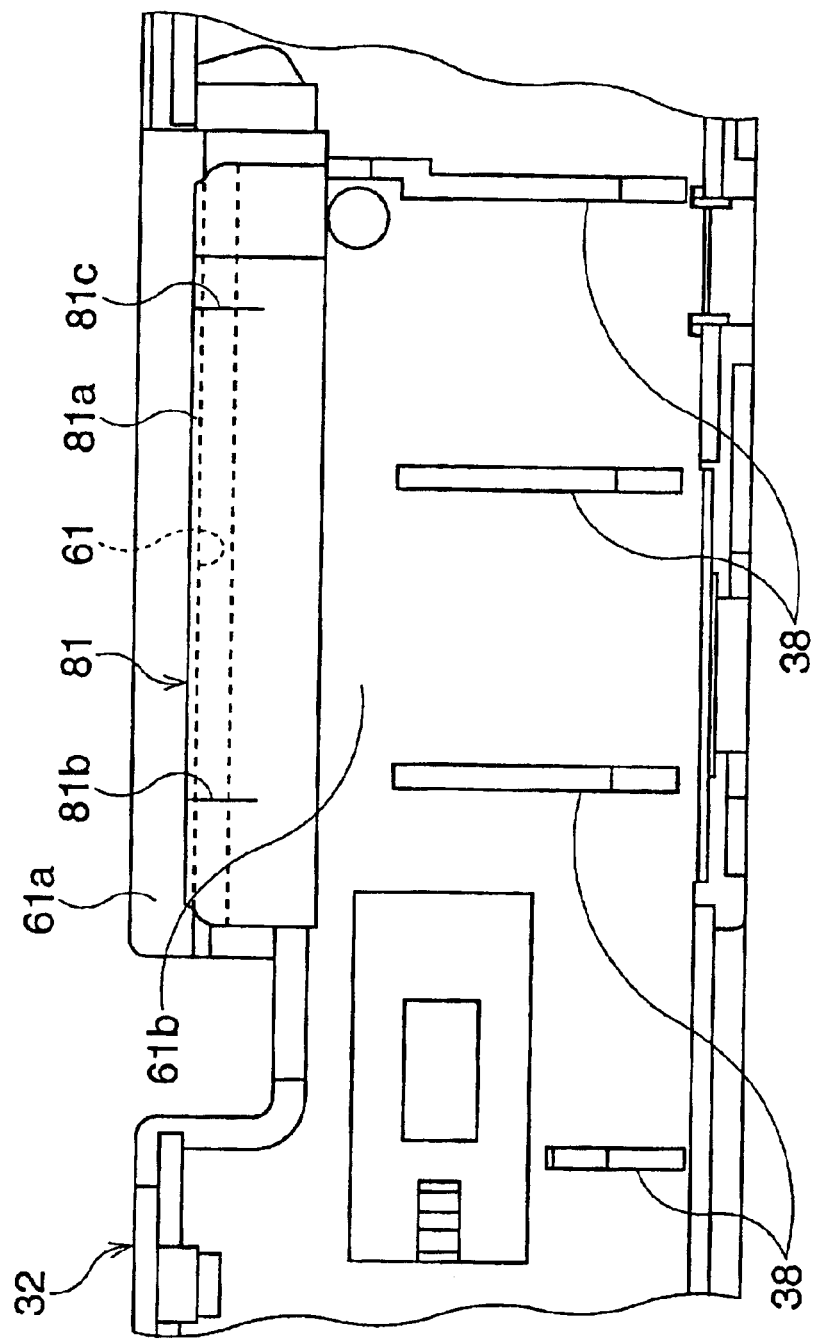
FIG. 11 is a view showing a rear cover viewed from the inside of the housing.

FIG. 11 is a view showing the rear cover 32 viewed from the inside of the housing. The guide slot 61, formed in the rear cover 32, is extended in a horizontal direction. The guide slot 61 is defined by an upper wall 61a and a lower wall 61b. A lever curtain 81 is adhered on an upper edge of the lower wall 61b. The lever curtain 81 is a rectangular piece of cloth, which has the substantially same length as that of the guide slot 61. One surface of the lever curtain 81 is coated by a rubber layer. The upper long side 81a of the lever curtain 81 is positioned close to the edge of the upper wall 61a, so that the lever curtain 81 covers the guide slot 61. In the lever curtain 81, slits 81b and 81c are formed close to the both end portions. The positions, where the slits 81b and 81c are formed, are the both ends of a range within which the lock lever 62 is moved in the guide slot 61. Each of the slits 81b and 81c is extended along the breadth direction of the lever curtain 81, and reaches the upper long side 81a of the lever curtain 81.

Figure 12:
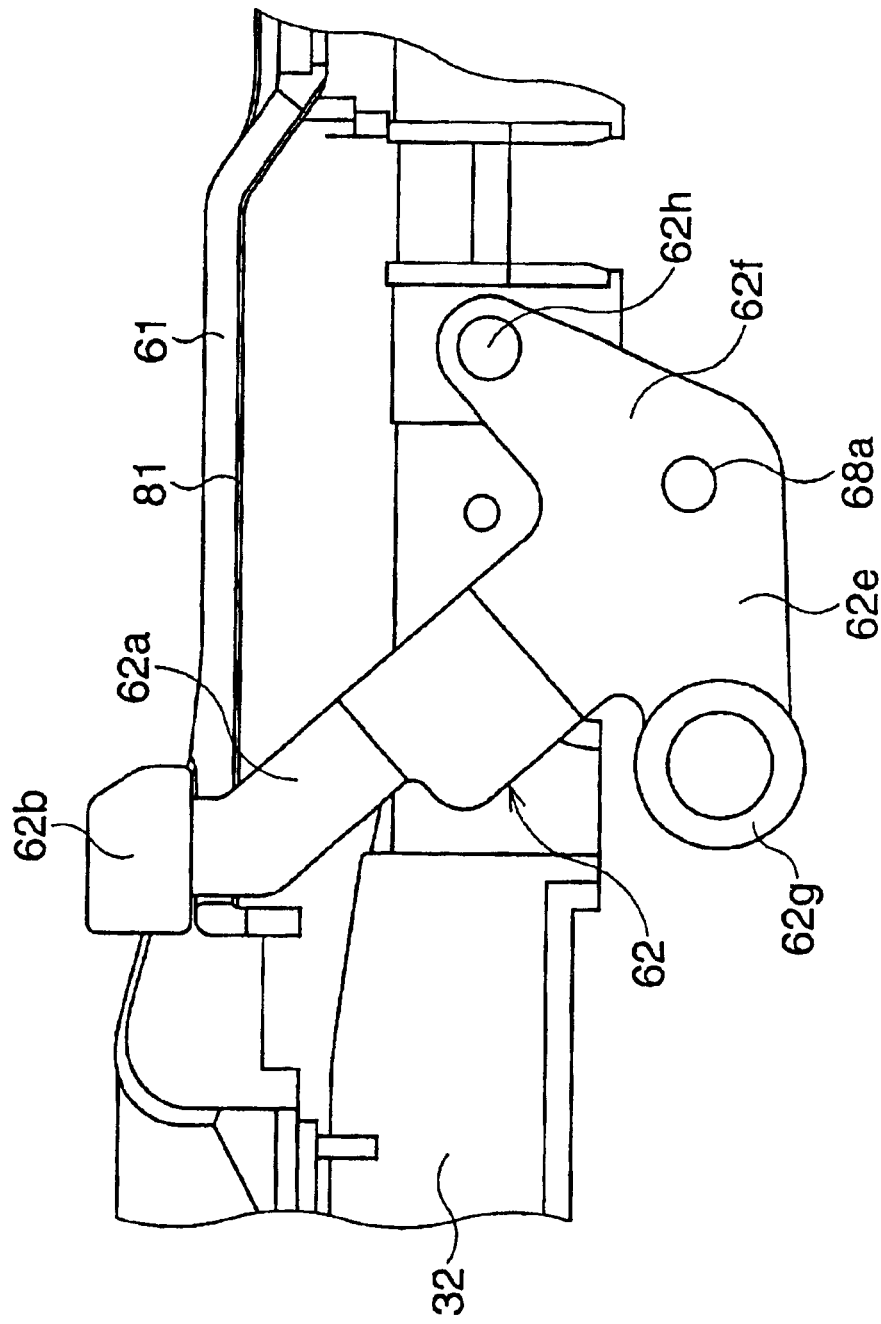
FIG. 12 a view showing the positional relationship between the lock lever and a guide slot at the lock position.
Figure 13:
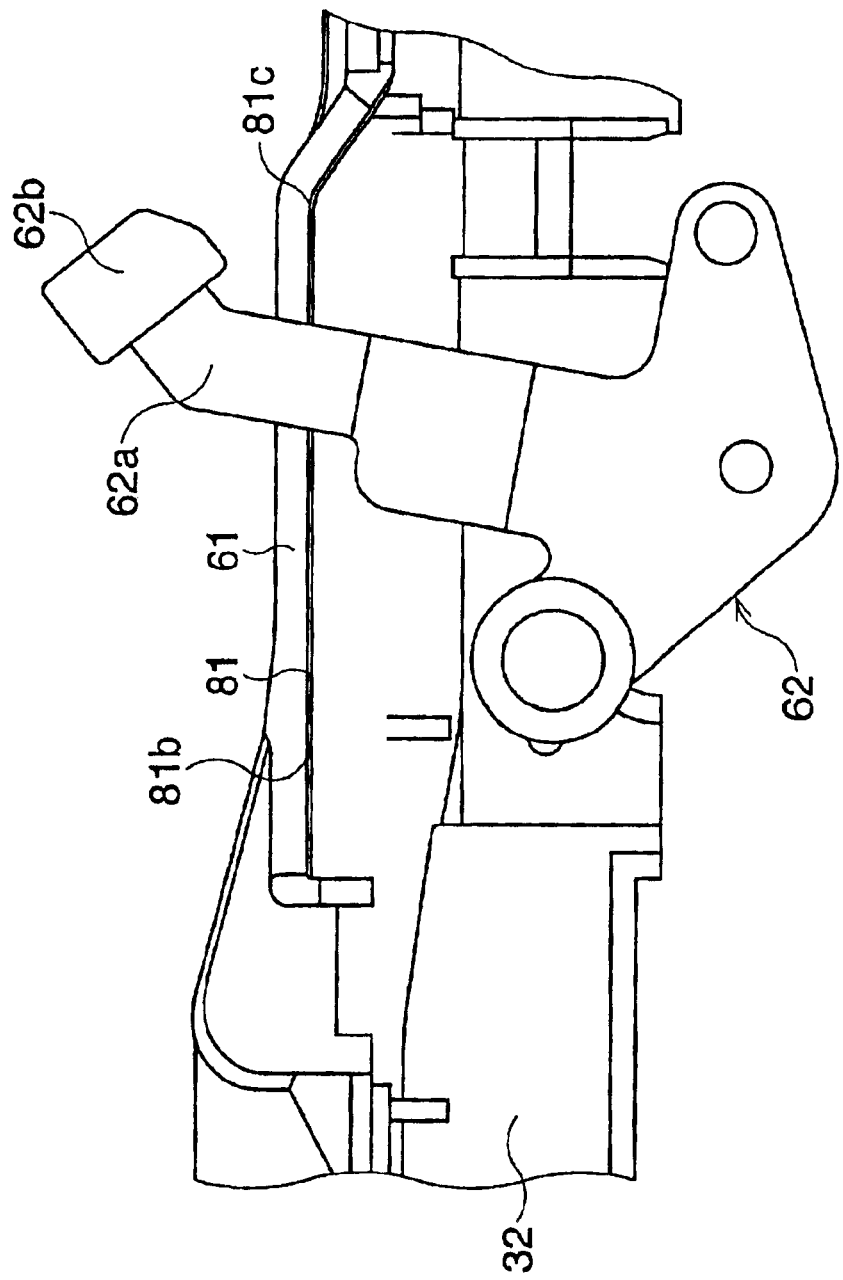
FIG. 13 is a view showing the positional relationship between the lock lever and the slot at the partial release position.
Figure 14:
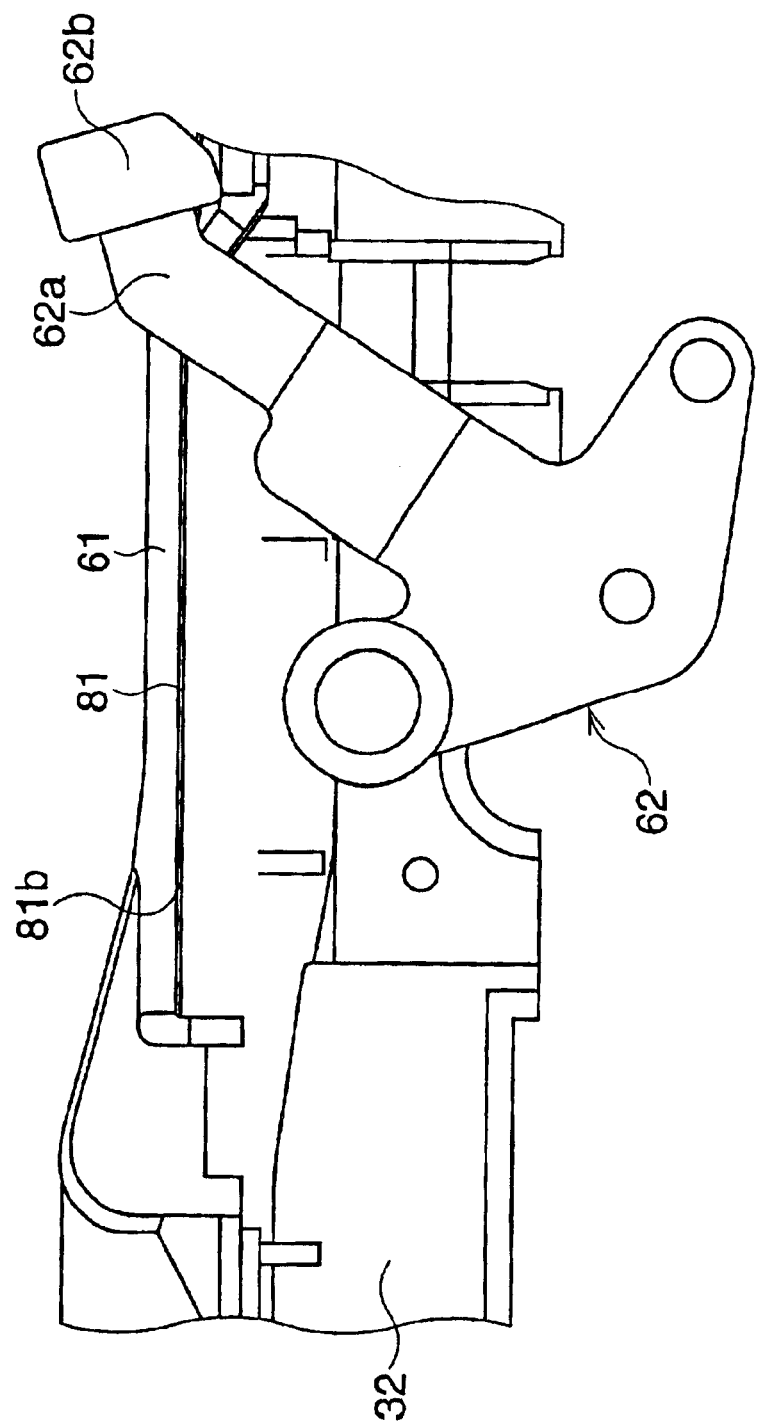
FIG. 14 is a view showing the positional relationship between the lock lever and the slot at the complete release position.
Figure 15:
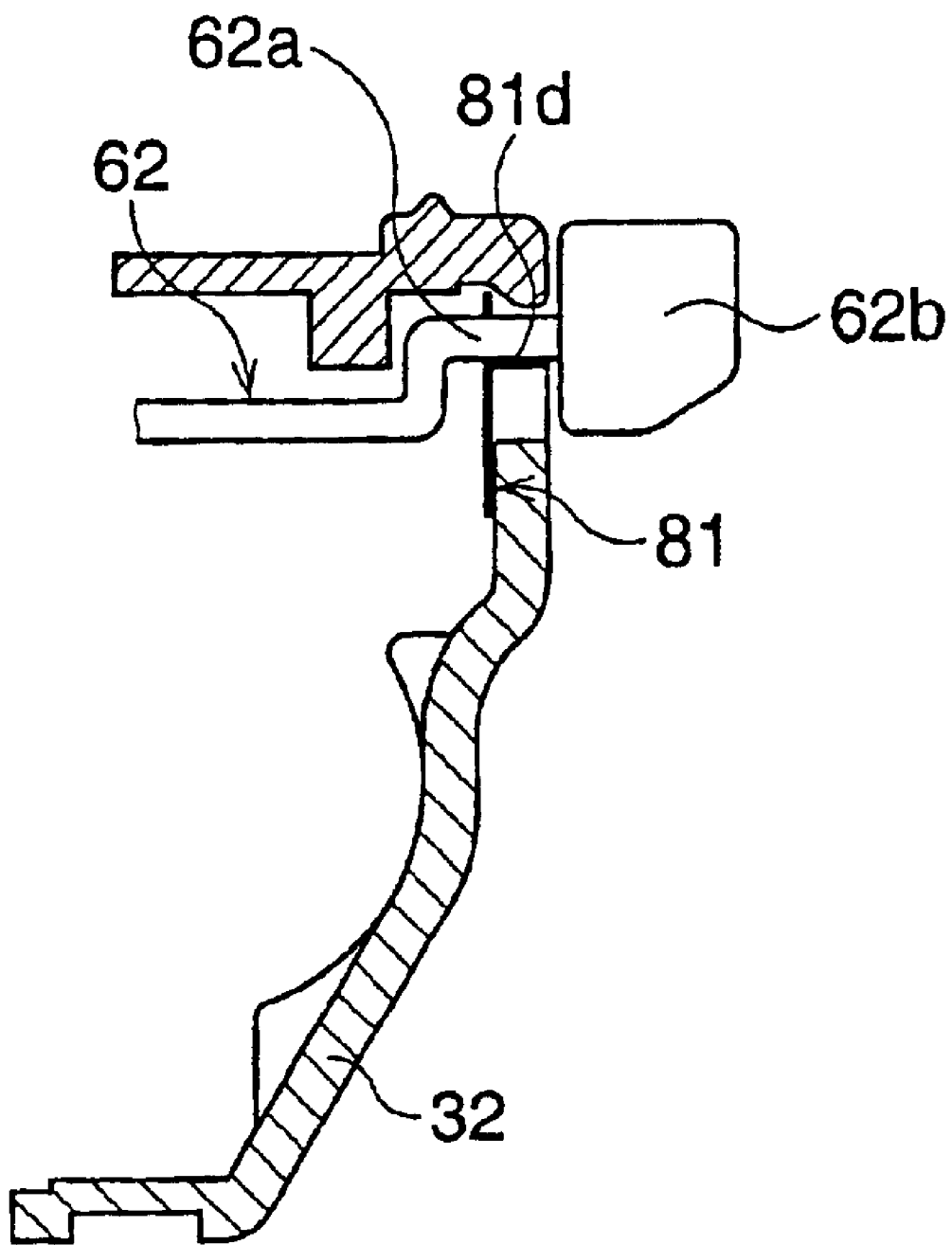
FIG. 15 is a sectional view showing an interference state of the arm of the lock lever and a lever curtain.

As shown in FIGS. 12, 13, and 14, the tip of the lock lever 62 or the lock button 62b is projected outside the housing through the guide slot 61. The lock lever 62 is rotatable around the pivot pin 68a, and with the rotation, the arm 62a of the lock lever 62 is moved along the longitudinal direction of the guide slot 61. An upper end portion 81d (see FIG. 15) of the lever curtain 81, interfering the arm 62a, is bent to the outside of the rear cover 32 by the arm 62a. A portion of the lever curtain 81, which does not interfere with the arm 62a, maintains the upright condition due to the restitution force of the lever curtain 81. Namely, the lever curtain 81 covers the guide slot 61 while allowing the lock lever 62 to move along the guide slot 61, and thus foreign matter such as dust is prevented from entering the accessory-grip 20 through the guide slot 61.

Figure 16:
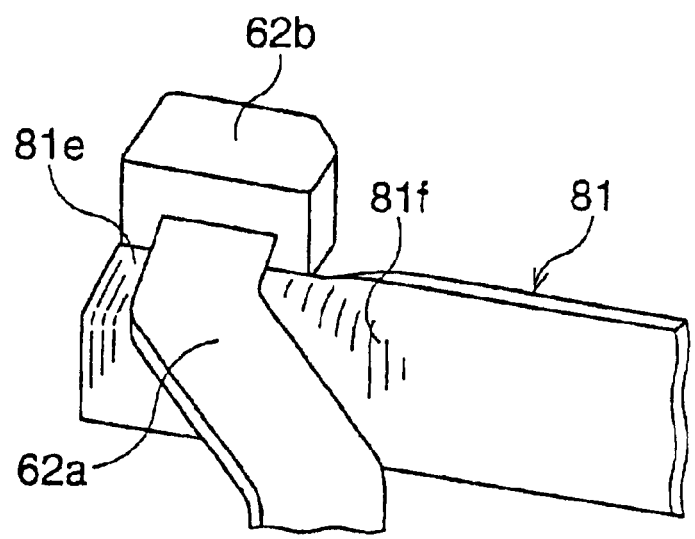
FIG. 16 is a perspective view showing a state in which the lock lever bends the lever curtain.

When the lock lever 62 is stopped at the lock position (see FIG. 12), the arm 62a interferes with the slit 81b of the lever curtain 81. Conversely, when the lock lever 62 is positioned at the partial release position (see FIG. 13), the arm 62a interferes with neither the slits 81b nor 81c, and when the lock lever 62 is positioned at the complete release position (see FIG. 14), the arm 62a interferes with the slit 81c. Therefore, when the lock lever 62 is positioned at the lock position, for example, as shown in FIG. 16, although a small piece of the lever curtain 81e, which is at the end side of the lever curtain 81 relative to the slit 81b (FIG. 11), is bent by the arm 62a, the center portion 81f on the opposite side of the slit 81b is partially bent. Due to this, the lever curtain 81 can cover the guide slot 61 as much as possible, and when the lock lever 62 is moved to the partial release position, the arm 62a smoothly bends the center portion 81f, so that the lever curtain 81 is prevented from being damaged.

Figure 17:
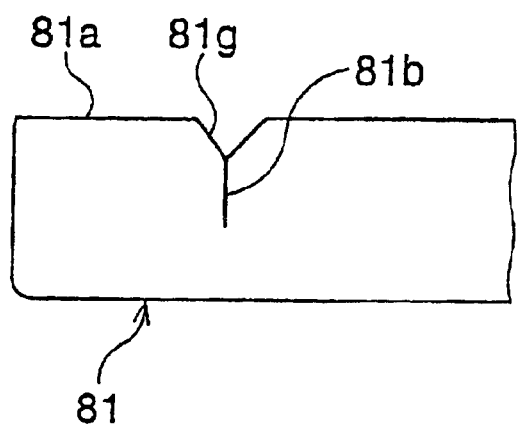
FIG. 17 is a view showing the other example of the lever curtain.

FIG. 17 shows another example of the lever curtain 81, in which an end portion of the slit 81b close to the long side 81a is chamfered to form a triangle notch 81g. Due to this construction, in a state shown in FIG. 16, the curvature of the center portion 81f of the lever curtain 81 becomes greater, so that the guide slot 61 can be better covered.

In the embodiment, only one long side of the lever curtain 81 is adhered on the upper edge of the lower wall 61a, and the other long side of the lever curtain 81, close to the upper plate 48, can be freely deformed. Accordingly, when disassembling and assembling the accessory-grip 20, the lever curtain 61 does not have to be separated from nor adhered to the rear cover 32. Further, since the portion of the lever curtain 61, which is elastically deformed by the arm 62a is farthest from the adhered portion, the portion can be extremely deformed and restored. Due to these points, the lever curtain 81 is advantageous in comparison with one in which a slit is formed along the longitudinal direction of the curtain, and the arm 62a is inserted in the slit to move along the slit.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application Nos. 2001-082110 and 2001-082122 (both filed on Mar. 22, 2001) which are expressly incorporated herein, by reference, in their entireties.

What is claimed is:

1. A device for locking an accessory-grip to a camera body, said device comprising:
   a housing;
   a lock lever that is movably supported by said housing, said lock lever being moved at least between a lock position and a partial release position different from said lock position; and
   first and second connecting members that are each movably supported by said housing for movement relative to said housing, and that can be displaced in association with said lock lever;
   said first and second connecting members being engaged with said camera body when said lock lever is positioned at said lock position, said first connecting member being released from said camera body while said second connecting member continuing to be engage with said camera body when said lock lever is positioned at said partial release position.

2. A device according to claim 1, wherein said first and second connecting members are released from said camera body when said lock lever is moved from said partial release position to a complete release position different from said lock and partial release positions.

3. A device according to claim 1, wherein said first and second connecting members move in the opposite directions to each other.

4. A device according to claim 1, wherein said first connecting member comprises a first connecting claw which has a flat plate inclining relative to the moving direction of said first connecting member by approximately 45 degrees, and said second connecting member comprises a second connecting claw having a rising portion extending vertically to the moving direction and an engaging portion extending from an upper end of said rising portion and inclining by an angle close to the horizontal.

5. A device for locking an accessory-grip to a camera body, said device comprising:
   a housing;
   a lock lever that is movably supported by said housing, said lock lever being moved at least between a lock position and a partial release position different from said lock position;

first and second connecting members that are movably supported by said housing, and that can be displaced in association with said lock lever;

said first and second connecting members being engaged with said camera body when said lock lever is positioned at said lock position, said first connecting member being released from said camera body while said second connecting member continuing to be engage with said camera body when said lock lever is positioned at said partial release position;

said first connecting member comprises a first connecting claw which has a flat plate inclining relative to the moving direction of said first connecting member by approximately 45 degrees, and said second connecting member comprises a second connecting claw having a rising portion extending vertically to the moving direction and an engaging portion extending from an upper end of said rising portion and inclining by an angle close to the horizontal; and wherein said camera body has a first opening, with which said first connecting claw engages, and a second opening, with which said second connecting claw engages, a first moving range of said first connecting claw being half the breadth of said first opening, a second moving range of said second connecting claw being approximately the same as the breadth of said second opening.

6. A device according to claim 5, further comprising pads disposed on said housing and close to said first and second openings.

7. A device according to claim 1, further comprising a click-stop mechanism giving a predetermined resistance against the movement of said lock lever when said lock lever is switched between said lock position and said partial release position.

8. A device according to claim 5, wherein said first connecting member has a third opening, in which signal contact pins for electrically connecting an electric circuit provided in said accessory-grip and an electric circuit provided in said camera body, are positioned.

9. A device for locking an accessory-grip to a camera body, said device comprising:

a housing;

a lock lever that is movably supported by said housing, said lock lever being moved at least between a lock position and a partial release position different from said lock position;

first and second connecting members that are movably supported by said housing, and that can be displaced in association with said lock lever, said first and second connecting members being engaged with said camera body when said lock lever is positioned at said lock position, said first connecting member being released from said camera body while said second connecting member continuing to be engage with said camera body when said lock lever is positioned at said partial release position; and a lock release member disposed at a position, which is close to an end portion of said lock lever fixed at said lock position, and which is opposite to said partial release position relative to said lock lever, said lock release member being movable in a direction substantially vertical to the moving direction of said lock lever.

10. A device according to claim 9, wherein an end surface of said lock release member is inclined to a plane vertical to the moving direction of said lock release member.

11. A device for locking an accessory-grip to a camera body, said device comprising:

a housing having a guide slot;

a lock lever that is provided for locking said accessory-grip to said camera body and releasing said accessory from said camera body, said lock lever projecting from said guide slot and being movable along said guide slot; and a lever curtain that is provided to a periphery of said guide slot to cover said guide slot and allow said lock lever to move along said guide slot.

12. A device according to claim 11, wherein said lever curtain is a rectangular piece of cloth having a surface which is coated by a rubber layer.

13. A device according to claim 11, wherein said lever curtain has a slit, which extends along the breadth direction of said lever curtain and reaches a long side of said lever curtain.

14. A device according to claim 13, wherein said slit is formed at an end of a range within which said lock lever is moved.

15. A device according to claim 13, wherein said slit is formed at a position where said lock lever is stopped, said lock lever interferes with said slit at the stopped position.

16. A device according to claim 13, wherein, in said lever curtain, an end portion of said slit close to said long side is chamfered.

17. A device for locking an accessory-grip to a camera body, said device comprising:

a housing;

a lock lever that is movably supported by said housing, said lock lever being moved at least between a lock position and a partial release position different from said lock position; and first and second connecting members that are each movably supported by said housing for movement relative to said housing, and that can be displaced in association with said lock lever;

said first and second connecting members being engaged with said camera body when said lock lever is positioned at said lock position, said first connecting member being released from said camera body while said second connecting member continuing to be engage with said camera body when said lock lever is positioned at said partial release position, and said first and second connecting members being released from said camera body when said lock lever is moved from said partial release position to a complete release position different from said lock and partial release positions.

18. A device according to claim 1, wherein said second connecting member is movable relative to said housing when said lock lever is positioned at a complete release position.

19. A device according to claim 17, wherein said second connecting member is movable relative to said housing when said lock lever is positioned at said complete release position.

* * * * *